United States Patent
Mao et al.

(10) Patent No.: US 11,919,170 B2
(45) Date of Patent: Mar. 5, 2024

(54) FAST METHOD FOR ROBOT PATH PLANNING WITH OBSTACLE AVOIDANCE

(71) Applicant: EDDA TECHNOLOGY, INC., Princeton, NJ (US)

(72) Inventors: Yuanfeng Mao, Mt Laurel, NJ (US); Guo-Qing Wei, Plainsboro, NJ (US); Firdous Saleheen, Lawrenceville, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 0 days.

(21) Appl. No.: 16/713,686

(22) Filed: Dec. 13, 2019

(65) Prior Publication Data

US 2021/0178590 A1    Jun. 17, 2021

(51) Int. Cl.
*B25J 9/16*    (2006.01)

(52) U.S. Cl.
CPC .................. *B25J 9/1666* (2013.01)

(58) Field of Classification Search
CPC ...... B25J 9/1666; B25J 9/1664; B25J 9/1669; B25J 9/1661; G05B 2219/40476
See application file for complete search history.

(56) References Cited

U.S. PATENT DOCUMENTS

| 7,664,571 | B2 * | 2/2010 | Gonzalez-Banos .... B25J 9/1664 345/473 |
| 9,102,055 | B1 | 8/2015 | Konolige et al. |
| 9,682,476 | B1 * | 6/2017 | Prats ...................... B25J 9/1664 |

(Continued)

FOREIGN PATENT DOCUMENTS

| AT | 401746 B | 4/1996 |
| CN | 102520718 B | 6/2013 |

(Continued)

OTHER PUBLICATIONS

International Search Report and Written Opinion dated Mar. 8, 2021 in International Application PCT/US2020/063714.

(Continued)

*Primary Examiner* — Khoi H Tran
*Assistant Examiner* — Nhi Q Bui
(74) *Attorney, Agent, or Firm* — Venable LLP

(57) ABSTRACT

The present teaching relates to a method and system for path planning. Information of a current pose of a robotic arm having a plurality of operable segments is obtained. The information includes a plurality of values, each of which corresponds to an angle formed between consecutive operable segments of the robotic arm. A desired pose where the robotic arm needs to reach is also obtained. An angle step-value is computed for the current pose of the robotic arm based on a function of a distance between the current pose and the desired pose, wherein the angle step value is to be used to determine a plurality of candidate next poses of the plurality of operable segments. One or more of candidate next poses is selected based on at least one criterion, and a trajectory is determined from the current pose to the desired pose based on the selected next poses.

18 Claims, 5 Drawing Sheets

(56) References Cited

U.S. PATENT DOCUMENTS

| | | | |
|---|---|---|---|
| 2013/0131865 A1* | 5/2013 | Yamane | B25J 9/1692 |
| | | | 700/254 |
| 2016/0016311 A1 | 1/2016 | Konolige et al. | |
| 2016/0221187 A1* | 8/2016 | Bradski | B25J 9/1664 |
| 2016/0308326 A1* | 10/2016 | Kasahara | H01S 3/0407 |
| 2017/0071672 A1 | 3/2017 | Shochat | |
| 2018/0243904 A1 | 8/2018 | Bradski et al. | |
| 2019/0291272 A1* | 9/2019 | Doan | B25J 9/1664 |
| 2019/0308326 A1* | 10/2019 | Liu | G06T 7/74 |
| 2020/0001454 A1* | 1/2020 | Iwasa | B25J 9/0081 |
| 2020/0376663 A1* | 12/2020 | Voelz | B25J 9/0084 |

FOREIGN PATENT DOCUMENTS

| | | | | |
|---|---|---|---|---|
| CN | 105764773 A | | 7/2016 | |
| CN | 109213147 A | | 1/2019 | |
| CN | 110181508 A | | 8/2019 | |
| DE | 102017129665 B3 | | 1/2019 | |
| JP | 2009134352 A | * | 6/2009 | ............ B25J 9/1664 |
| JP | 2015037818 A | | 2/2015 | |
| WO | 2009069653 A1 | | 6/2009 | |

OTHER PUBLICATIONS

Correll, Nikolaus, "Introduction to Robotics #4: Path-Planning," Correll Lab CU Computer Science, Sep. 14, 2011.

Glasius, Roy et al., "Neural Network Dynamics for Path Planning and Obstacle Avoidance," Neural Networks, vol. 8, No. 1, pp. 125-133, Feb. 28, 1994.

First Office Action dated Nov. 29, 2023 in Chinese Patent Application No. 202011460856.9.

* cited by examiner

FAST METHOD FOR ROBOT PATH PLANNING WITH OBSTACLE AVOIDANCE

BACKGROUND OF THE INVENTION

1. Field of the Invention

The present disclosure relates to a system and method of robot path planning with obstacle avoidance. In particular, the present disclosure is related to a fast method for planning movements of a robotic arm while avoiding obstacles.

2. Description of Related Art

Robotic path planning methods try to find a trajectory of robot motion from an initial position to a goal position. For a robotic arm having multiple joints, the degrees of freedom (DOF) in the motion equals to the number of joints. Therefore, there are as many possible moves as the number of joints for each movement. Generally, it may be required that the motion be smooth, the length of trajectory be short, there be no singularities in the path, and obstacles be avoided. Usually the continuous space of joint angles may be discretized as a high-dimensional grid. The path planning may be performed in the grid of the joint angle space.

Existing path planning methods may be categorized into two types: non-deterministic and deterministic. Non-deterministic methods, such as the Rapidly Exploring Random Tree (RRT) algorithm explore the next movement of a robot randomly, with a bias toward large unsearched areas. Such methods are fast since at each step only one of the next possible moves in the grid is explored. However, the methods may not guarantee a feasible path. The path found by the RRT method may not be bounded in length. Furthermore, the movements maybe different if re-planned for a second time due to the random nature of the search. The deterministic methods, such as the A* algorithm explore all possible moves in the grid by minimizing a cost function. The generated path is unique. However, the planning process may be slow, since all neighbors in the grid may need to be explored.

Therefore, it is highly desirable to provide a deterministic path planning method that is fast and provides a path that is as close as possible to the optimal path of the traditional deterministic algorithms.

BRIEF DESCRIPTION OF THE DRAWINGS

Aspects of the present disclosure described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is directed to a method and system for robot path planning while avoiding obstacles. Specifically, the present disclosure is directed to a system and method of planning a path for a robotic arm having multiple joints while avoiding obstacles. A robotic arm as referred to herein is an arm of a robot having a plurality of segments. A pose (i.e., position and orientation) of the robotic arm may be determined by a plurality of values (e.g., angle values) each of which corresponds to an angle formed between consecutive operable segments of the robotic arm.

Figure 1:
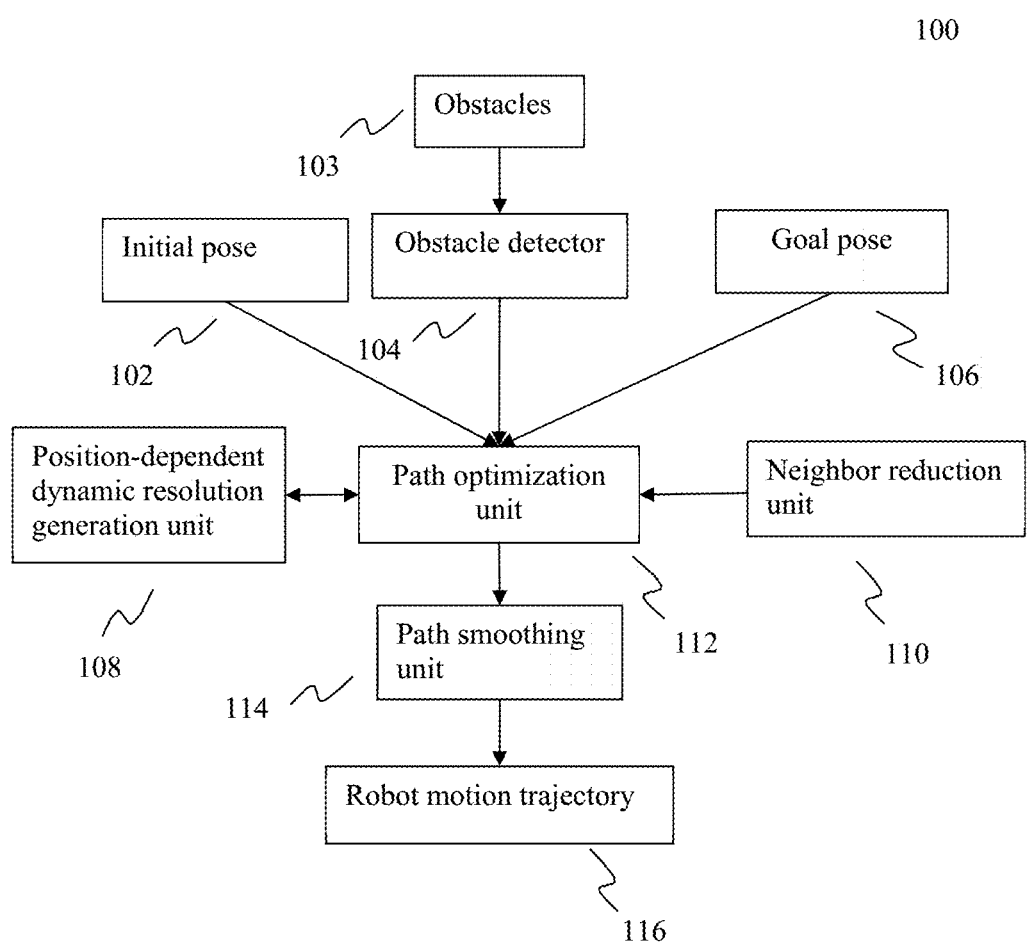
FIG. 1 depicts an exemplary system diagram for robot path planning.

FIG. 1 shows an exemplary system diagram 100 for facilitating robot path planning, i.e., robotic arm path planning, according to an embodiment of the present teaching. The system 100 includes an obstacle detector 104, a position-dependent dynamic resolution generation unit 108, a neighbor reduction unit 110, a path optimization unit 112, and a path smoothing unit 114.

As stated above, by one embodiment of the present disclosure, a robotic arm may have multiple joints. Specifically, the robot's arm may include multiple segments, wherein a connection between adjacent segments is referred to as a joint. Typical robots may have 6 or 7 joints, meaning that the robot may have 6 or 7 degrees of freedom (DOF) in movement. The robot's initial pose (i.e., position and orientation) 102 may be characterized by angles formed between the joints (referred to herein as joint angles). It must be appreciated that the joint angles may also characterize any other position of the robot motion, e.g., when a target object has changed its position after robot has started to move toward the target. The obstacles 103 may represent one or more subjects within the robot's working space that are each identified by the obstacle detector 104. The obstacle(s) may be a surgeon, a patient's body part, or any another medical device in the operating room. The goal pose (i.e., final position and orientation) 106 may represent a desired pose of the robot's arm. It must be appreciated that the robot's arm may include an end-effector (i.e., a device or tool connected at an end of the robot's arm). The goal pose in joint angles may be computed from the desired end-effector's pose (position and orientation) based on robot inverse kinematics.

Robot path planning may usually be performed in a discretized space of joint angles. Each joint angle may be discretized by an interval δ (also referred to herein as an angle step-value). For example, for a 6-DOF robot, any particular position may be represented by a joint angle configuration $J=(j_1, j_2, j_3, j_4, j_5, j_6)$, where $j_i$ is the joint angle of the i-th joint. The term configuration is used to represent the combined joint angles of all joints, which uniquely determines the end-effector's pose. According to one embodiment, after the robot moves to a next position, each of the joints may be in one of the joint angles at $j_i-δ, j_i, j_i, +δ, i=1, 2, \ldots, 6$. It must be noted that during an iteration of path planning for the robotic arm, a joint may remain at the same joint angle as in the previous position. However, it is prohibited that all the joints remain in the same angle as in the previous iteration, since this represents a no-motion status. Therefore, there may be $3^6-1=728$ possible moves (for a total of N=6 joints) from one configuration to the next. In the discretized joint angle space, a joint angle configuration may also be referred to as a node in the grid of joint angles. The path planning problem becomes that of finding a path starting from the initial node in the grid to the desired node in the grid while satisfying certain criteria. The desired node may also be referred to as the ending node or goal node.

The position-dependent dynamic resolution generation unit 108 may generate a grid of non-constant intervals (step-values) to improve the efficiency in finding a path. The neighbor reduction unit 110 may trim the search space from one node to its neighboring nodes, so that only important nodes may be visited. Details regarding the dynamic resolution generation unit 108 and the neighbor reduction unit 110 are described next. The path optimization unit 112 may find the optimal path from the initial node to the goal node based on certain criteria. The output of the path optimization unit is a motion trajectory, which specifies the sequences of robot motion to reach the goal node. The path smoothing unit 114 may smooth out jitter motions generated by the path optimization unit 112. The output of the smoothing is a smoothed motion trajectory 116.

Figure 2:
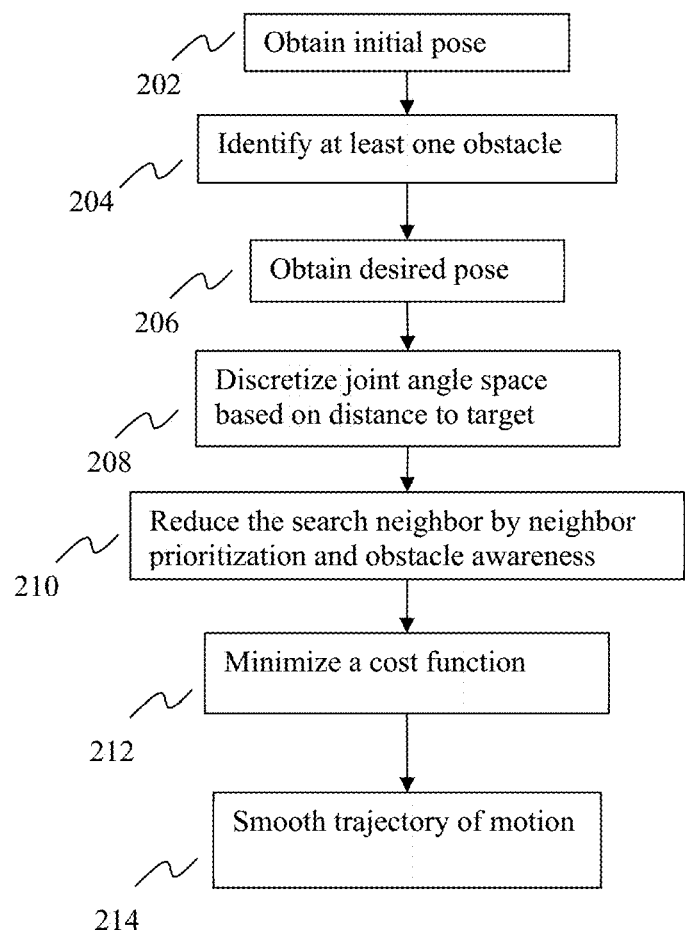
FIG. 2 illustrates an exemplary flow diagram for path planning.

FIG. 2 illustrates an exemplary flow diagram for robot path planning, according to one embodiment of the present teaching. At step 202, the robot's initial joint angles at the starting pose may be obtained. At step 204, one or more obstacles may be identified. At step 206, the goal/desired pose of the robot joint angles may be obtained. At step 208, the robot joint angle space may be discretized. Denote the discretization interval at the n-th node $s_n$ in the joint angle grid by $\delta_n$. The discretization resolution $\delta_n$ i.e., the angle step-value may be expressed as a function of the distance from the current node to the goal node as $$\delta_n = w(c_n)$$

Where $c_n$ is the distance from the n-th node to the goal node, and $w(c_n)$ is a function of $c_n$. The distance $c_n$ may be defined as the Euclidian distance between the joint angles at the n-th node and those at the goal node, while the function $w(c_n)$ may be a linear, parabolic or sigmoid function of the distance $c_n$. An exemplar embodiment of the sigmoid function may take the following form $$w(c_n) = \frac{\delta_{max}}{1 + e^{\left(1 - c_n * \left(\frac{2}{\rho}\right)\right) * \alpha}}$$

where $\delta_{max}$ is the maximum resolution, $\alpha$ is a shape factor controlling the steepness of the curve, and $\rho$ is the estimated longest distance between initial node and goal node. The optimal value of $\alpha$ may be found experimentally but may usually be set at 6. When $\alpha$ is set at 6, at the initial node when $c_n = \rho$, the resolution $\delta_n$ will be close to $\delta_{max}$, whereas at the goal node $c_n = 0$, the resolution $\delta_n$ will be a very small number close to 0. When the path is planned from the initial position to the goal position, the resolution will gradually change from $\delta_{max}$ to a very small number. Intuitively, the dynamic resolution may be interpreted as follows. When the robot is far away from the goal position, it may move at a bigger step, while when it is closer to the goal position, it may move at a smaller step. Conventional methods of path planning use a resolution that is constant across the full path. In the present teaching, the discretization resolution may be made dynamically depending on the distance from the current node to the goal node.

At step 210, the search space from each node to its neighboring nodes may be reduced. One embodiment of the reduction may be based on neighbor prioritization. At each node of the joint angle grid, there are 728 neighboring nodes for a 6-DOF robot arm. One embodiment of the prioritization may be that only neighbors whose all 6 joint angles get changed may be considered. That means that, at node n, if $j_{i,n} = j_{i,n+1}$, meaning that the i-th joint does not change when moving from node n to node n+1, node n+1 may be eliminated. That means that each joint may only have two states for the next move: the angle is either incremented or decremented by the step-value. This corresponds to a reduction to $2^6 - 1 = 63$ neighbors, in comparison to the original 728 neighboring nodes. This is more than 90% reduction of the original number of neighbors. By one embodiment of the present disclosure, instead of requiring all the six joint angles to be changed (from their previous values), a number of joint angles that have changed may be determined. Further, for neighborhood reduction purposes, only those neighbors which have the number of changed joint angles greater than a predetermined threshold may be considered.

Another embodiment of the neighbor reduction may be based on obstacle awareness. If the movement from node n to a neighbor hits an obstacle or is within a distance which is not allowed from the obstacle, the direction of the move may be added to a set of avoidable directions for node n. Denote that set by A(n). After all neighbors of node n have been visited, the set A(n) contains motion directions that should be avoided. This set may be applied to the direct neighbors of node n when it comes to the time to explore those neighbors. The intuition is that if any exploring direction of a node is toward an obstacle, that direction shall be avoided when its direct neighbors are exploring their own neighbors, since there is a to high probability that there is an obstacle in the same direction.

After the neighborhood reduction, a trajectory is determined based on the reduced neighborhood which minimizes a cost function (step 212), using the conventional A* algorithm. By one embodiment, the details of the cost function and minimization are described below. Suppose a trajectory includes N steps, 1, 2, . . . , N. At any intermediate step n, the cost from the starting position to the n-th position may be denoted by g(n). The cost g(n) may be defined as the Euclidian distance between the joint angles (i.e., configuration of the end-effector) at the initial position and those at the n-th step. Another cost that provides an estimate of the cost from the n-th step to the ending step (N) may be denoted by h(n). The cost h(n) may be defined as the Euclidian distance between the joint angles at the n-th step and those at step N (the goal pose). Denote the minimum distance, i.e., smallest distance, of the robot arm (including end-effector) from all the obstacles at step n by c(n). The total cost function f(n) at the n-th step may take the form of:

$$f(n) = g(n) + h(n) - \omega * c(n)$$

where $\omega$ is a constant weighting factor greater than zero. The weight $\omega$ balances between the joint angle cost and the obstacle-distance cost. The weighting factor may be learned through a process as described in U.S. patent application Ser. No. 16/692,264, which is incorporated herein in its entirety. The minimization of the cost function f(n) may be performed using an existing method, such as the A* algorithm. The path planned after the neighbor reduction may generate a sub-optimal path in comparison to the full neighbor search. At step 214, the found path may be smoothed to generate a smooth trajectory.

Figure 3:
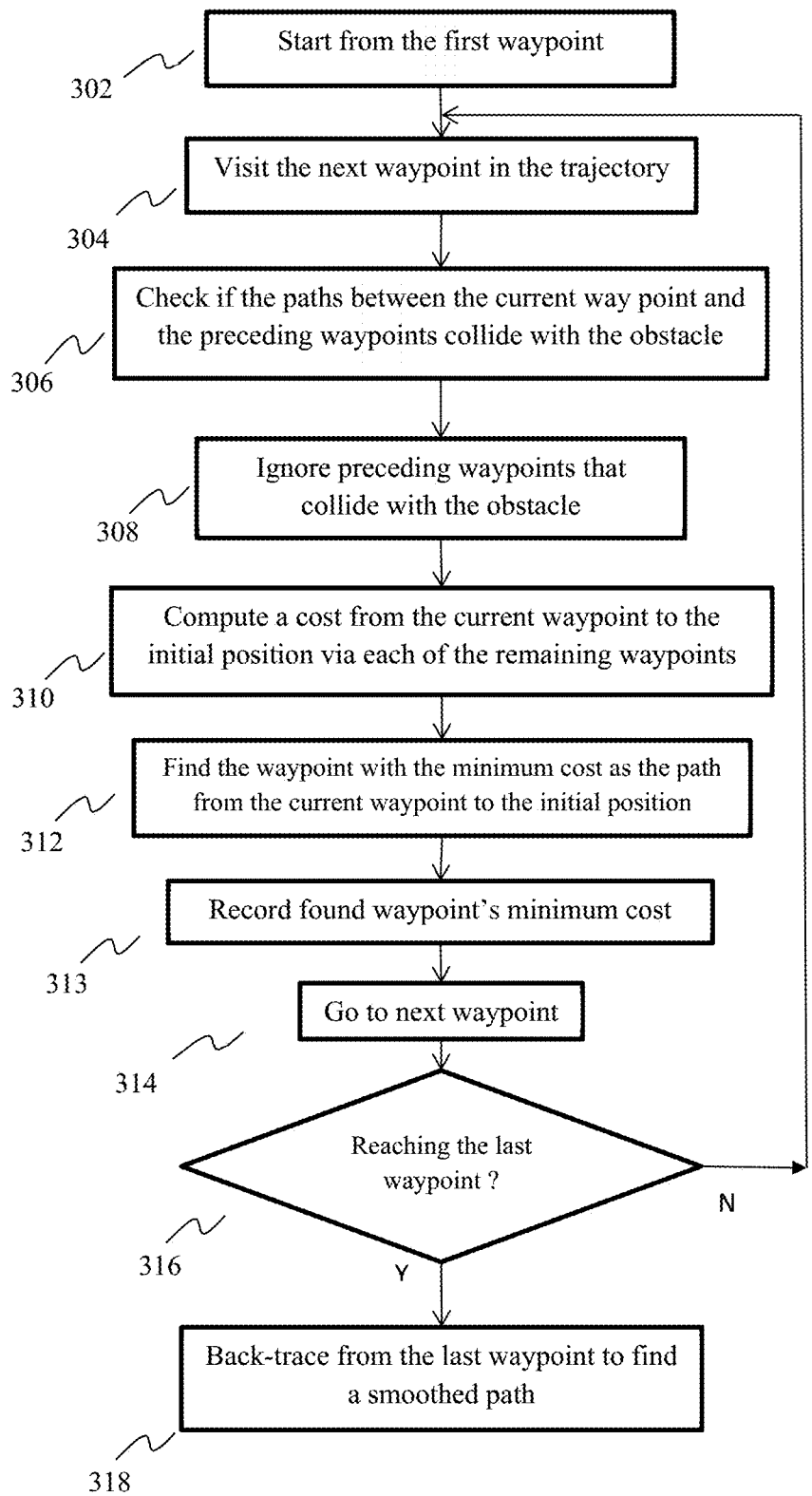
FIG. 3 illustrates an exemplary flow diagram for path smoothing.

FIG. 3 illustrates an exemplary flow of path smoothing for step 214, according to one embodiment of the present teaching. The nodes that constitute the trajectory are referred to herein as waypoints $p_k$, k=1, 2 . . . , N, where N is the number of waypoints. The smoothing of the trajectory is to pick waypoints that makes a smooth trajectory while at the same time ensuring that the new trajectory does not collide with the obstacle. The smoothing starts at step 302 with the first waypoint. Then the next waypoint will be visited at step 304. At step 306, it is checked if the direct path connecting the current waypoint $p_k$ to each of the preceding waypoints $\{p_1, p_2, \ldots, p_{k-1}\}$ collides with the obstacle. Here direct path means the path generated by moving directly from one waypoint to another. At step 308, ignore the preceding waypoints whose direct paths to the current waypoint $p_k$ collide with the obstacle. Then for each of the remaining non-colliding waypoints $\{p_m\}$, a cost may be computed. The cost may be computed as a weighted sum of the Euclidean distance from the current waypoint $p_k$ to the preceding waypoint $p_m$ and the cost at $p_m$. The cost at $p_m$ was already computed when the waypoint $p_m$ was visited the first time. Intuitively this is the cost to go from the current waypoint $p_k$ to the first waypoint via the waypoint $p_m$.

At step 312, the waypoint among all the preceding waypoints $\{p_m\}$ with the minimum cost is picked. At step 313, the minimum cost is stored for the picked waypoint as the cost of that waypoint. At step 314, the waypoint index may be incremented by 1 to go to the next waypoint $p_{k+1}$. At step 316, it is checked if the next way point $p_{k+1}$ has reached the last waypoint N. If not, the above process may be repeated. Otherwise, a backtracking may be performed at step 318 to retrieve the smoothed path. The backtracking may be performed by starting with the last waypoint to retrieve the minimum-cost waypoint via which the first waypoint is reached. The minimum-cost waypoint will be used as a new waypoint to retrieve its own minimum-cost waypoint. This process repeats until the first waypoint is reached.

Figure 4:
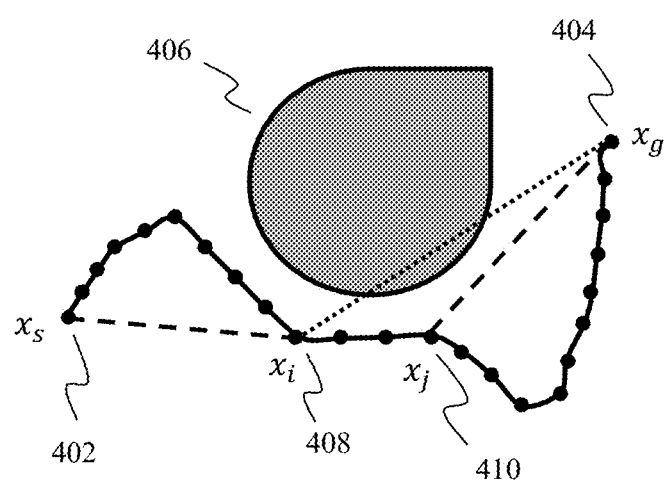
FIG. 4 shows an example of path smoothing.

FIG. 4 illustrates an example of the key steps in path smoothing. The solid line is a trajectory and the dots on the line are waypoints. The point $x_s$ (402) is the first waypoint, the point $x_9$ (404) is the last waypoint, and 406 is an obstacle. At waypoint $x_i$ (408), the direct path to the first waypoint $x_s$ is the path of minimum cost, and that minimum cost is stored as the cost for the waypoint $x_i$. From waypoint $x_j$ (410), the weighted sum of the cost from $x_j$ to $x_i$ and the cost at waypoint $x_i$ is the minimum among all preceding waypoints of $x_j$. From the last waypoint $x_9$, the direct path from $x_9$ to its preceding waypoint $x_i$ hits the obstacle, and therefore that path will not be considered. The waypoint $x_j$ is the waypoint of minimum cost from $x_9$. The back-traced path from the last waypoint to the first waypoint is $x_g$-$x_j$-$x_i$-$x_s$.

Figure 5:
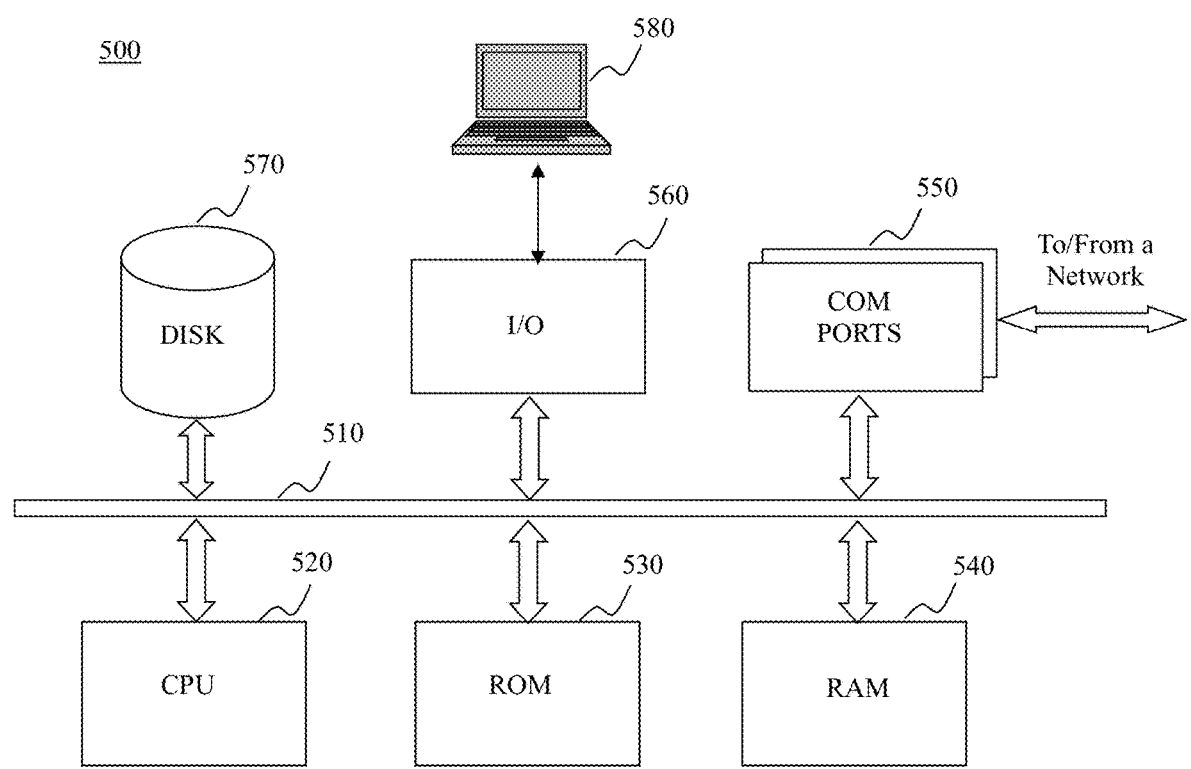
FIG. 5 depicts an architecture of a computer which can be used to implement a specialized system incorporating the present teaching.

FIG. 5 is an illustrative diagram of an exemplary computer system architecture, in accordance with various embodiments of the present teaching. Such a specialized system incorporating the present teaching has a functional block diagram illustration of a hardware platform which includes user interface elements. Computer 500 may be a general-purpose computer or a special purpose computer. Both can be used to implement a specialized system for the present teaching. Computer 500 may be used to implement any component(s) described herein. For example, the present teaching may be implemented on a computer such as computer 500 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 500, for example, may include communication ports 550 connected to and from a network connected thereto to facilitate data communications. Computer 400 also includes a central processing unit (CPU) 520, in the form of one or more processors, for executing program instructions. The exemplary computer platform may also include an internal communication bus 510, program storage and data storage of different forms (e.g., disk 570, read only memory (ROM) 530, or random access memory (RAM) 540), for various data files to be processed and/or communicated by computer 500, as well as possibly program instructions to be executed by CPU 520. Computer 500 may also include an I/O component 560 supporting input/output flows between the computer and other components therein such as user interface elements 580. Computer 500 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer of the robot's motion planning system into the hardware platform(s) of a computing environment or other system implementing a computing environment or similar functionalities in connection with path planning. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the robot's motion planning system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed:

1. A method, implemented on a machine having at least one processor, storage, and a communication platform capable of connecting to a network for path planning, the method comprising:
    obtaining information of an initial pose of a robotic arm having a plurality of operable segments, wherein the information includes a plurality of values, each of which corresponds to an angle formed between consecutive operable segments of the robotic arm;
    obtaining a desired pose where the robotic arm needs to reach;
    computing an angle step-value for the initial pose of the robotic arm based on a function of a distance between the initial pose and the desired pose, where the function of the distance uses an estimated longest distance between the an initial position and a goal position;
    calculating a plurality of candidate next poses of the plurality of operable segments based on the angle step-value;
    filtering the plurality of candidate next poses based on a required number of changed joint angles between the plurality of operable segments, resulting in a plurality of filtered candidate next poses;
    selecting one or more of the plurality of filtered candidate next poses based on at least one criterion; and
    determining a trajectory from the initial pose to the desired pose based on the selected one or more candidate next poses, wherein the trajectory uses a dynamic resolution such that each step along an entirety of the trajectory is smaller than a previous step.

2. The method of claim 1, wherein the at least one criterion further comprises each of the selected one or more candidate next poses having values for each of the angles associated with the plurality of operable segments that are different than corresponding values for each of the angles associated with the initial pose.

3. The method of claim 1, wherein the at least one criterion further comprises each of the one or more selected candidate next poses being a predetermined distance away from one or more obstacles observed between the initial pose and the desired pose.

4. The method of claim 1, wherein the at least one criterion further comprises each of the selected one or more candidate next poses having a number of angles associated with the plurality of operable segments having values that are different than corresponding values for the angles associated with the initial pose being greater than a threshold.

5. The method of claim 1, wherein the angle step-value computed for the initial pose of the robotic arm is greater than the angle step-value computed for the selected one or more candidate next poses.

6. The method of claim 1, further comprising:
    smoothing the determined trajectory, wherein the trajectory includes a plurality of waypoints, each of which is associated with a pose of the robotic arm, the smoothing being based on a cost computed for each waypoint.

7. A system for path planning, the system comprising: at least one processor configured to:
    obtain information of an initial pose of a robotic arm having a plurality of operable segments, wherein the information includes a plurality of values, each of which corresponds to an angle formed between consecutive operable segments of the robotic arm,
    obtain a desired pose where the robotic arm needs to reach,
    compute an angle step-value for the initial pose of the robotic arm based on a function of a distance between the initial pose and the desired pose, where the function of the distance uses an estimated longest distance between the an initial position and a goal position,
    calculate a plurality of candidate next poses of the plurality of operable segments based on the angle step-value,
    filter the plurality of candidate next poses based on a required number of changed joint angles between the plurality of operable segments resulting in a plurality of filtered candidate next poses,
    select one or more of the plurality of filtered candidate next poses based on at least one criterion, resulting in selected one or more candidate next poses, and
    determine a trajectory from the initial pose to the desired pose based on the selected one or more candidate next poses, wherein the trajectory uses a dynamic resolution such that each step along an entirety of the trajectory is smaller than a previous step.

8. The system of claim 7, wherein the at least one criterion further comprises each of the selected one or more candidate next poses having values for each of the angles associated with the plurality of operable segments that are different than corresponding values for each of the angles associated with the initial pose.

9. The system of claim 7, wherein the at least one criterion further comprises each of the one or more selected candidate next poses being a predetermined distance away from one or more obstacles observed between the initial pose and the desired pose.

10. The system of claim 7, wherein the at least one criterion further comprises each of the selected one or more candidate next poses having a number of angles associated with the plurality of operable segments having values that are different than corresponding values for the angles associated with the initial pose being greater than a threshold.

11. The system of claim 7, wherein the angle step-value computed for the initial pose of the robotic arm is greater than the angle step-value computed for the selected one or more candidate next poses.

12. The system of claim 7, wherein the at least one processor is further configured to:
    smooth the determined trajectory, wherein the trajectory includes a plurality of waypoints, each of which is associated with a pose of the robotic arm, the smoothing being based on a cost computed for each waypoint.

13. A non-transitory machine-readable medium having information recorded thereon for searching data, wherein the information, when read by a machine, causes the machine to perform the steps of:
- obtaining information of an initial pose of a robotic arm having a plurality of operable segments, wherein the information includes a plurality of values, each of which corresponds to an angle formed between consecutive operable segments of the robotic arm;
- obtaining a desired pose where the robotic arm needs to reach;
- computing an angle step-value for the initial pose of the robotic arm based on a function of a distance between the initial pose and the desired pose, where the function of the distance uses an estimated longest distance between the an initial position and a goal position,
- calculating a plurality of candidate next poses of the plurality of operable segments based on the angle step-value;
- filtering the plurality of candidate next poses based on a required number of changed joint angles between the plurality of operable segments, resulting in a plurality of filtered candidate next poses;
- selecting one or more of the plurality of filtered candidate next poses based on at least one criterion, the at least one criterion comprising a cost function with an iteratively generated weighting factor using, for each iteration, and
- determining a trajectory from the initial pose to the desired pose based on the selected one or more candidate next poses and the minimizing, wherein the trajectory uses a dynamic resolution such that each step along an entirety of the trajectory is smaller than a previous step.

14. The medium of claim 13, wherein the at least one criterion further comprising each of the selected one or more candidate next poses having values for each of the angles associated with the plurality of operable segments that are different than corresponding values for each of the angles associated with the initial pose.

15. The medium of claim 13, wherein the at least one criterion further comprising each of the one or more selected candidate next poses being a predetermined distance away from one or more obstacles observed between the initial pose and the desired pose.

16. The medium of claim 13, wherein the at least one criterion further comprises each of the selected one or more candidate next poses having a number of angles associated with the plurality of operable segments having values that are different than corresponding values for the angles associated with the initial pose being greater than a threshold.

17. The medium of claim 13, wherein the angle step-value computed for the initial pose of the robotic arm is greater than the angle step-value computed for the selected one or more candidate next poses.

18. The medium of claim 13, further comprising:
- smoothing the determined trajectory, wherein the trajectory includes a plurality of waypoints, each of which is associated with a pose of the robotic arm, the smoothing being based on a cost computed for each waypoint.

* * * * *